United States Patent [19]

Minter et al.

[11] Patent Number: 4,586,634

[45] Date of Patent: May 6, 1986

[54] VALVE ACTUATING LATCHING COUPLER FOR HIGH PRESSURE DEVICE

[75] Inventors: Mark A. Minter; William L. Driskell, both of Lee's Summit, Mo.

[73] Assignee: Puritan-Bennett Corporation, Overland Park, Kans.

[21] Appl. No.: 588,811

[22] Filed: Mar. 12, 1984

[51] Int. Cl.⁴ .......................... B67B 7/24; F16L 37/28

[52] U.S. Cl. .......................................... 222/3; 222/509; 222/518; 251/149.6; 251/340; 137/322

[58] Field of Search .................... 222/3, 153, 189, 396, 222/397, 509, 518, 505, 511; 137/322; 251/148, 149.8, 340, 149.6

[56] References Cited

U.S. PATENT DOCUMENTS

| | | | |
|---|---|---|---|
| 3,648,893 | 3/1972 | Whiting | 222/3 |
| 3,924,654 | 12/1975 | Buller et al. | 137/322 |
| 4,331,175 | 5/1982 | Brake et al. | 137/322 |

*Primary Examiner*—Joseph J. Rolla
*Assistant Examiner*—Michael S. Huppert
*Attorney, Agent, or Firm*—Schmidt, Johnson, Hovey & Williams

[57] ABSTRACT

An easily manipulable, high mechanical advantage latching-actuator apparatus for high pressure gas cylinders is provided which employs a single, bidirectionally rotatable operating collar for latching, on-off gas valve operation, and delatching, so as to facilitate gas therapy and cylinder replacement by patient users. In preferred forms, the apparatus includes a slotted valve body affixed to a gas cylinder, along with a separate actuating assembly including a rotatable operator and a reciprocable valve actuator; locking tabs are secured to the operator, and a cam mechanism is used to couple the operator and the valve actuator. Rotation of the operator in a latching direction serves to first move the tabs into latching engagement with the body slot, whereupon, after further rotation of the operator in the same direction past an intermediate "off" position, the valve actuator is cammed into an "on" position for opening the valve carried by the body, thus permitting gas flow from the cylinder. Counter rotation of the operator from the "on" position first permits the valve to close when the operator moves to the "off" position, followed by delatching of the assembly from the valve body. The apparatus hereof can be used on a wide variety of gas cylinders such as large, stationary cylinders or smaller units designed for ambulatory patients, and can be made gas-specific to preclude inadvertent use of improper gas by the patient.

22 Claims, 9 Drawing Figures

VALVE ACTUATING LATCHING COUPLER FOR HIGH PRESSURE DEVICE

BACKGROUND OF THE INVENTION

1. Field of the Invention

The present invention is broadly concerned with an improved latching and actuator apparatus designed for use with high pressure gas cylinders typically used by patients suffering from respiratory diseases or other ailments, in order to greatly facilitate the needed gas therapy. More particularly, it is concerned with such a latching-actuator apparatus which includes a single operator which can be readily shifted by the user to accomplish all needed functions, including on-off gas flow operations and cylinder replacement.

2. Description of the Prior Art

Gas inhalation therapy has been used for many years as a beneficial treatment for many diseases. For example, oxygen therapy has long been prescribed by physicians for patients suffering from such ailments as chronic respiratory and heart diseases (e.g., emphysema, chronic bronchitis, angina, etc.). The oxygen or other gases used in this therapy can be bottled in disposable containers, or, more typically, in reusable high pressure cylinders. In the latter case, the cylinders are normally equipped with a connection yoke which is threadably secured to the cylinder, along with a valve operator and pressure regulator. In use, the patient opens the valve in order to permit gas flow from the cylinder, and, after the appropriate therapy, the valve is turned off. When the cylinder is depleted, however, it is generally necessary to have a fresh cylinder delivered and hooked up to the yoke and valve structure.

The foregoing procedures are in common use, but they present a number of significant problems. In the first place, many patients requiring gas therapy are very weak and lacking in dexterity, and therefore proper manipulation of the on-off valve associated with the gas cylinder can be difficult (it typically requires at least two and one-half foot-pounds of torque to operate the valve). For example, if the valve is not completely closed after use, the cylinder gas can be wasted, and the pressure regulator is subjected to the effects of continual pressure, something which should be avoided.

The operational problems associated with gas cylinder changeovers are even more acute than those involving the on-off valve. Indeed, the problems encountered in changing gas cylinders are so formidable that, almost universally, this operation must be done by a service technician. About eight foot-pounds of torque or more may be required to release and install a cylinder yoke, and these levels of torque can be difficult to achieve by many patients.

While most bedridden and convalescent patients requiring gas therapy make use of large, stationary cylinders of gas, so-called ambulatory units are also available for patients permitted more freedom of movement. Obviously, the gas cylinders used in the latter instances are much smaller than the large stationary cylinders. Nevertheless, the same general problems as outlined above plague ambulatory gas therapy devices as well. As a consequence, most ambulatory patients tend to purchase the largest possible portable gas cylinders, so as to minimize the need for returning to a dealer for changeover servicing by a technician. This of course presents problems to the ambulatory patient, in that the overall apparatus is rather large, heavy and bulky; but many patients prefer this rather than making repeated trips to the dealer for cylinder replacements.

SUMMARY OF THE INVENTION

The present invention overcomes the problems described above, and provides a greatly improved latching-actuator apparatus for attachment to the outlet of a source of pressurized fluid such as a medicinal gas. Broadly speaking, the apparatus of the invention includes a body having means (e.g., a threaded connector) for coupling of the body to the gas source such as a high pressure cylinder; the body advantageously includes a gas flow passageway therethrough, along with selectively openable and closeable valve means operatively interposed in the passageway. In addition, the apparatus of the invention includes an actuator assembly separable from the body which preferably includes as a part thereof a shiftable operating collar or element. Latching structure having a movable portion is also provided for selectively latching the actuator assembly to, and delatching the assembly from, the valve body. Finally, the movable portion of the latching structure, and the valve means, are operably coupled to the shiftable operating element for permitting opening of the valve means only upon shifting of the element and subsequent to latching of the assembly to the body. In addition, the components are coupled so as to permit delatching of the assembly from the body only upon shifting of the operating element and after the valve means is closed. In this fashion, manipulation of but a single shiftable element (preferably a bidirectionally rotatable collar) serves to latch and delatch the actuating assembly from the valve body (thus greatly facilitating cylinder replacements), and also to open and close the valve means associated with the apparatus for convenient on-off operation.

In preferred forms, the actuator assembly includes an elongated, centrally disposed, tubular valve-actuating member, along with a cam mechanism operably coupled between the shiftable operator and the valve actuating member for axial reciprocation of the latter in response to shifting of the operator. The valve actuating member cooperates with valve-engaging components carried by the valve body, so that upon appropriate shifting or rotation of the operator, the valve is selectively opened and closed. The preferred cam mechanism forming a part of the actuator assembly also gives a high mechanical advantage to the apparatus of the invention, and greatly reduces the torque necessary for operation thereof. In fact, latching, delatching and on-off operation of the apparatus of the invention typically requires only about one and one-half foot pounds of torque, and this is a decided advantage for enfeebled patients. Moreover, because of the ease of operation of the latching-actuator apparatus of the invention, cylinder replacements can be readily accomplished, even by the patient. This is a decided boon for ambulatory patients, who can now carry smaller, less cumbersome cylinders and replacement "spares", which can quickly be connected for use, completely avoiding the need for technician servicing.

DESCRIPTION OF THE PREFERRED EMBODIMENTS

Figure 1:
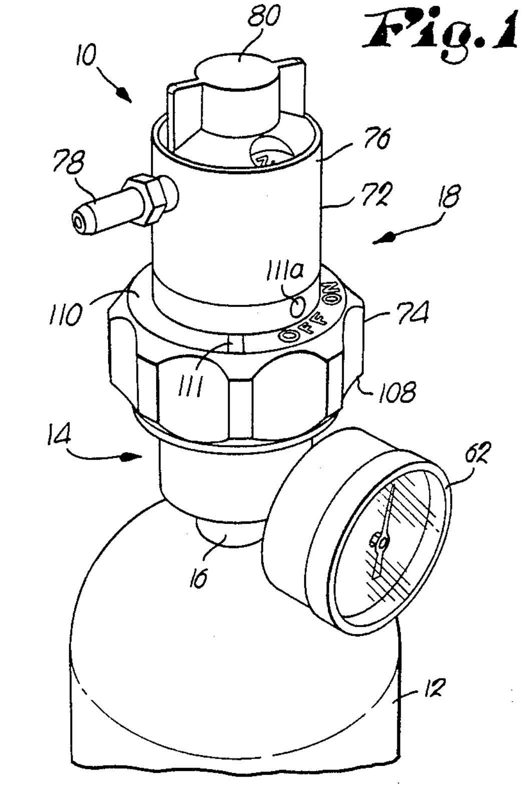
FIG. 1 is a fragmentary perspective view of a high pressure gas cylinder, having the latching-actuator apparatus of the invention operatively coupled thereto.
Figure 5:
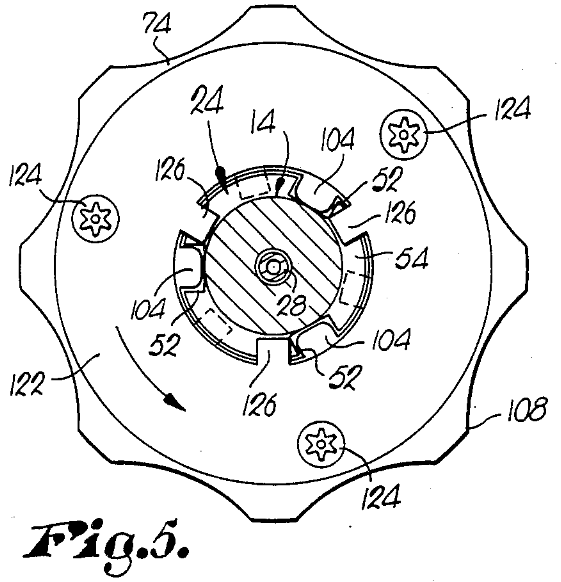
FIG. 5 is a sectional view taken along line 5—5 of FIG. 4 which illustrates the configuration of the underside of the actuator assembly.

Turning now to the drawings, a latching and actuator apparatus 10 is illustrated in FIG. 1 in operative disposition connected to a high pressure cylinder 12 of conventional construction containing a quantity of pressurized gas such as oxygen. Broadly speaking, the apparatus 10 includes a lowermost valve body 14 which is threadably secured to the outlet neck 16 of cylinder 12, and an actuator assembly 18 separate from the valve body 14 but in use operatively connected thereto as will be more fully explained.

In more detail, the valve body 14 includes an elongated, annular, externally threaded connection end 20 adapted to be received within complementally threaded neck 16 of bottle 12, an elongated axially extending, central passageway 22 (having a lower terminus orifice 23) which communicates with the bore defined by end 20, and an uppermost, annular, externally slotted head 24. In addition, the body 14 includes a poppet assembly 26 which is situated within the connection end bore, and an elongated, tubular, axially reciprocable valve operator 28 located above poppet assembly 26 and within the confines of passage 22.

Figures 2, 3, 4:
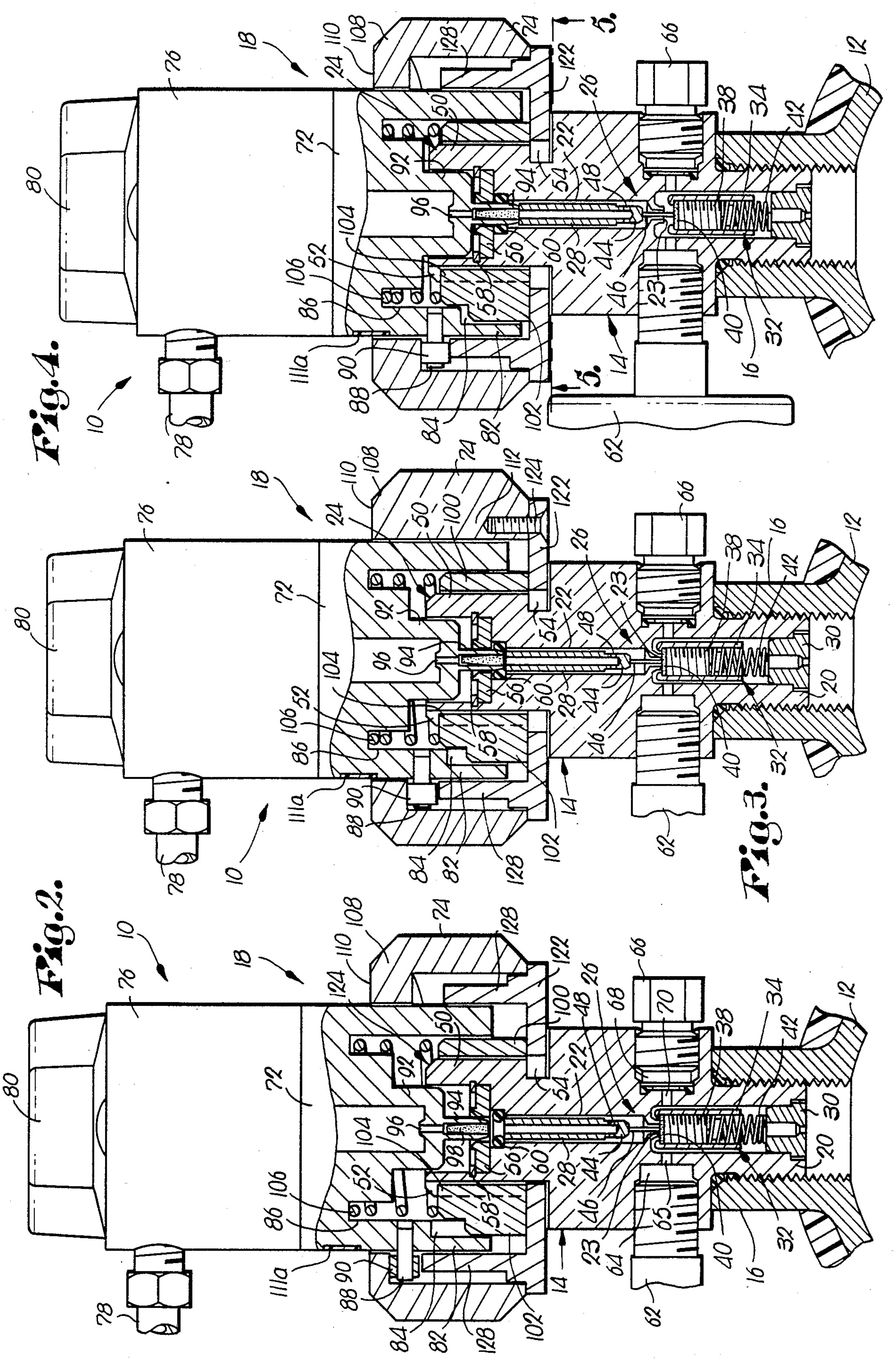
FIG. 2 is a fragmentary view in partial vertical section illustrating the internal construction of the latching-actuator apparatus, and depicting the actuator assembly in its "connect" position relative to the valve body.
FIG. 3 is a view similar to that of FIG. 2, but illustrates the actuator assembly in its "off" position relative to the valve body.
FIG. 4 is a view similar to that of FIGS. 2-3, but depicts the actuator assembly in its "on" position relative to the valve body, wherein the valve mechanism is open to permit gas flow from the cylinder to the discharge outlet of the latching-actuator apparatus.

Referring specifically to FIGS. 2–4, it will be seen that poppet assembly 26 includes a lowermost, axially bored plug 30 which is press fitted into the lowermost end of connection end 20. A selectively openable and closeable valve assembly 32 is situated above plug 30, and includes an elongated, tubular, internally threaded sleeve 34 having a plurality of elongated, radially outwardly extending guide ribs 36 affixed to the exterior surface thereof. As will be seen from FIGS. 2–4, the sleeve 34 is loosely fitted within the space defined by connection end 20, and moreover includes an internal threaded carrier 38 and an uppermost valve seat 40, the latter being engageable with the lowermost end of passageway 22. A helical compression spring 42 is operatively positioned within the confines of sleeve 34 below carrier 38, and engages the upper end of plug 30 as shown; in this fashion, the spring 42 serves to bias valve seat 40 against the lowermost orifice 23 of passageway 22 as specifically depicted in FIGS. 2 and 3.

The valve operator 28 is generally tubular in configuration, but includes a solid lowermost end 44. An elongated, upwardly projecting pin 46 is affixed to carrier 38, with the uppermost end of the pin being oriented for engagement by the lower end 44 of operator 28. In addition, the operator 28 includes a pair of opposed gas flow apertures 48 adjacent end 44, for purposes which will be made clear.

The slotted head end 24 of valve body 14 includes an upstanding annular wall 50 provided with three equally circumferentially spaced, axially extending orienting slots 52 on the periphery talong with a horizontally extending, continuous circumscribing latching slot 54, the orienting slots 52 being in communication with the lower latching slot 54. The inner recessed central region of head 24 includes an annular, chamfered guide ring 56 held in place by means of a retainer 58, as well as a sealing O-ring 60 beneath the guide ring 56 and in axial alignment therewith.

A conventional pressure gauge 62 is threadably coupled to valve body 14 by means of an appropriate threaded port 64. An aperture 65 is provided to communicate port 64, and thereby gauge 62, with the bore defined by connection end 20. In like manner, a safety relief vent assembly 66 is operatively secured within a port 68 provided in valve body 14, the port 68 being in communication with the bore of connection end 20 through a communicating aperture 70.

From the foregoing description, it will be readily appreciated that a gas flow passageway is provided through the length of body 14. This passageway is cooperatively defined by the central bore through plug 30, the bore defined by connection end 20, and specifically the annular region thereof outboard of sleeve 34, orifice 23, passageway 22, gas flow apertures 48, the central bore of valve operator 28 and the guide ring 56. Further, it will be seen that the valve assembly 32 is defined by valve seat 40 and the seat structure presenting the lower terminus 23 of passageway 22; and that the assembly 32 is operatively disposed along the length of the gas flow passageway for selectively permitting and precluding flow therealong as desired.

The actuator assembly 18 broadly includes an axially reciprocable flow control body 72 along with a bidirectionally rotatable operating collar or element 74. The flow control body 72 includes an uppermost bonnet 76 which houses a conventional gas flow regulator (not shown), the latter being operatively coupled to gas discharge nipple 78. A shiftable flow control knob 80 is situated atop bonnet 76, and is operable for controlling the operation of the flow regulator.

Figure 6:
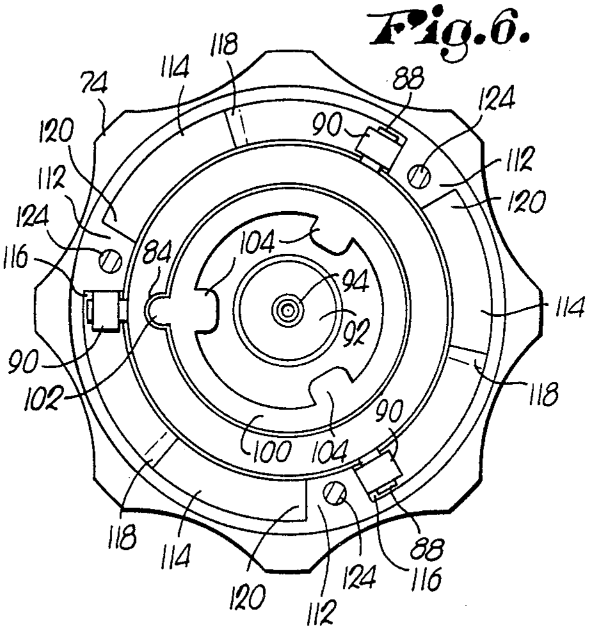
FIG. 6 is a bottom view of the separable actuator assembly of the invention, illustrated with the lowermost plate of the rotatable operator removed.

The lower or connection end of the flow control body 72 includes a depending annular skirt 82 provided with a single, upright, inner locking slot 84 (see FIG. 6), and an upper annular spring-receiving cavity 86. In addition, three equally circumferentially spaced, radially outwardly extending cam pins 88, each provided with a bearing sleeve 90, are affixed to the outer periphery of the skirt 82 for purposes which will be made clear.

The central portion of the lower end of valve body 72 is in the form of a downwardly extending, tubular, circular in cross-section projection 92, the latter including a central, downwardly extending, tubular valve operating member 94. An axial bore 96 is also provided which communicates the interior of projection 92 with the bore of operating member 94, so that a second fluid flow path through assembly 18 is defined by the member 94, bore 96, projection 92, the pressure regulator apparatus and nipple 78. A filter 98 is situated within the confines of tubular valve operating member 94 for the purpose of filtering gas passing through the overall apparatus to nipple 78.

The assembly 18 further includes an axially reciprocable upright metallic sleeve 100 having a single, elongated, upright, outwardly extending guide rib 102 and three elongated, inwardly extending, equally circumferentially spaced, upright orienting ribs 104. As will be apparent from a study of FIGS. 2–4 and 6, the sleeve 100 is sized to fit within the confines of depending skirt 82, with guide rib 102 being slidably received within the locking slot 84. In this fashion, relative axial movement between the flow control body 72 and sleeve 100 is permitted, whereas relative axial rotation between these components is precluded.

A coil compression spring 106 also forms a part of the assembly 18, and is situated at its upper end within spring-receiving cavity 86; the lower end of the spring 106, as best seen in FIGS. 2–4, engages the upper surface of sleeve 100.

Figure 7:
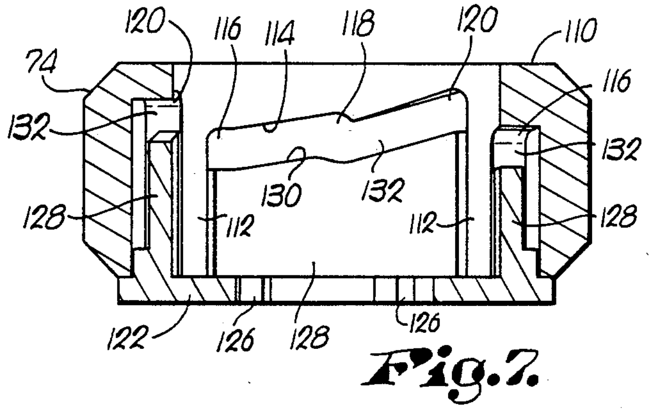
FIG. 7 is a vertical sectional view of the rotatable operating collar, and illustrating in detail the cam slot structure provided in the collar.

Operating collar 74 is positioned adjacent and receives the lower connection end of flow control body 72. The collar includes an outboard gripping component 108 provided with exterior gripping recesses and a top wall 110 having three circumferentially spaced operational indicia thereon, namely, a mark 111 signifying the "connection" position, and the words "off" and "on." These indicia are oriented relative to a dot 111*a* on body 72 in a manner which will become clear. The inner sidewall of gripping component 108 is provided with three equally circumferentially spaced, upstanding, elongated stop ribs 112 which extend inwardly to a point closely adjacent the outer surface of depending skirt 82 of flow control body 72. The underside of top wall 110 is specially configured to present three identical, circumferentially spaced cam surfaces 114 which extend between the stop ribs 112. Each of the cam surfaces 114 are identical, and include three stop positions along the length thereof, namely the "on" position stop 116, the "off" position stop 18, and the "connect" stop position 120 (see FIGS. 6 and 7).

The overall operating collar 74 also includes a bottom wall 122 of generally annular configuration which is releasably secured to the gripping component 108 by means of screws 124 passing into appropriate bores provided in the undersides of the spaced stop ribs 112. The bottom wall 122 extends inwardly and supports the underside of sleeve 100 (see FIGS. 2–4). Moreover, the bottom wall is provided with a central aperture therethrough, along with three equally circumferentially spaced, inwardly extending locking tabs 126. Three arcuate, upstanding, circumferentially spaced inboard walls 128 extend upwardly from bottom wall 122 and are located adjacent the inner sidewall surface of the gripping component 108. These inboard walls 128 fit between the stop ribs 112 of the gripping component 108; moreover, the uppermost surface of each of the inboard walls 128 is complementally configured with respect to the three corresponding cam surfaces 114 provided along the underside of top wall 110 of the gripping component 108. Thus, and referring specifically to FIG. 7, it will be seen that the upper periphery of each inboard wall 128 presents a cam surface 130 which is complemental with the opposed cam surface 114; accordingly, it will be seen that the operating collar presents a total of three circumferentially spaced cam slots 132 around the periphery thereof which are respectively located between adjacent pairs of stop ribs 112. Each of these slots 132 slidably receives a cam pin 88 and sleeve 90 secured to the skirt 82, as will be apparent from a study of FIGS. 1–4.

It will also be observed that the lowermost connection end of flow control body 72, as well as the operating collar 74, cooperatively present a central opening for receiving the slotted head 24 of the valve body 14; in addition, the locking tabs 126 extend into this head-receiving opening.

The use and operation of the latching-actuator apparatus 10 can best be understood from a consideration of FIGS. 2–6. Initially, the actuator assembly 18 is separate from the valve body 14, with the latter being operatively connected to high pressure gas cylinder 12; in this configuration, spring 42 serves to bias valve seat 40 into sealing engagement with the lower seating terminus 23 of passage 22, thereby preventing gas flow from the cylinder.

When it is desired to interconnect the overall apparatus and use the same, the separate actuator assembly 18 is grasped, and operating collar 74 is rotated until the locking tabs 126 affixed to bottom wall 122 are in axial alignment with the orienting ribs 104 of sleeve 100. This corresponds to a position where dot 111*a* is adjacent the mark 111, with the cam pins 88 located in the "connect" stop positions 120 of the cam grooves 132. In this "connect" orientation, the lower connection end of assembly 18 is fitted onto the upper slotted head 24 of valve body 14. To this end, the aligned tabs and guide ribs 126, 104 of the assembly 18 are oriented within and passed down the length of the upright orienting slots 52 of the head 24, until the bottom wall 122 of collar 74, and the inwardly projecting tabs 126, bottom out against the portion of valve body 14 directly beneath head 24. In this position, the respective tabs 126 extend into the confines of circumferential locking slot 54 directly beneath head 24. This orientation of the assembly is depicted in FIG. 2. In this disposition it will be seen that the member 94 is in alignment with the bore of guide ring 56, so as to place the fluid passageways through the body 14 and assembly 18 in position for full operative communication upon appropriate operation of the apparatus 10.

The next step in the use of the apparatus 10 involves grasping the collar 74 and rotating the same in a clockwise or latching direction (all of the following descriptions assume that assembly 18 is being viewed in plan) to the intermediate "off" position, where dot 111*a* on body 72 comes into alignment with the word "off" on collar 74. During such rotation, the locking tabs 126 are rotated with respect to the guide ribs 102, and are fully moved into the confines of locking slot 54. At this point, the assembly 18 is fully latched and removal of the assembly 18 from the valve body 14 is precluded. In addition, at this point no gas is flowing, inasmuch as valve assembly 32 remains in a closed position.

Also during the clockwise rotation to the intermediate "off" position, the cam mechanism provided by the pins 88 and cam grooves 132 comes into play. Specifically, during rotation of the operator 74, the flow control body 72, and as a consequence the tubular valve actuating member 94, is cammed axially downward by virtue of the relative rotational movement between the pins 88 and cam grooves 132. This in turn moves the member 94 through the central openings of guide ring 56 and O-ring 60, to a point slightly spaced from the upper end of valve operator 28. Such axial shifting is accomplished against the bias provided by spring 106. Further, a distinct stopping or resting point is provided at the intermediate off position, because of seating of the bearings 90 in the arcuate "off" stop positions 118 provided in the cam grooves 132. This "off" position of assembly 18 is depicted in FIG. 3.

If it is next desired to turn the apparatus "on" so as to initiate gas flow from cylinder 12, the operator 74 is turned further in the clockwise or latching direction past the intermediate "off" position to the "on" position where dot 111*a* aligns with the word "on." During this operation, the tabs 126 are moved further within the confines of the locking slot 54, and to a point closely adjacent the next stop rib 112; however, the assembly 18 is maintained at all times in a firmly latched relationship relative to the body 14. As another consequence of continued clockwise rotation of the operator 74, the flow control body 72 (and hence the valve operating member 94) are cammed further downward through the described cam mechanism so that the lowermost end of the member 94 engages the upper end of operator 8 and shifts the same downward. This has the effect of pushing valve seat 40 away from the lower terminus 23 of passageway 22, through the medium of pin 46. Additionally, the bearings 90 seat in the arcuate "on" positions 116 of the grooves 132, with a distinct stop. This "on" position is depicted in FIG. 4. In this orientation, it will be seen that gas from cylinder 12 flows through the central bore of plug 30 outwardly through the annular region defined between sleeve 34 and the defining wall surface of the connection end bore 20, through orifice 23, passageway 22, apertures 48, the bore of operator 28, the bore of operating member 94, and filter 98, and bore 96 into the pressure regulator portion of the assembly 18. From the pressure regulator, the gas flows through nipple 78 and, conventionally, through appropriate tubing leading to the patient's mask.

When it is desired to return the actuator assembly 18 to its "off" position, it is only necessary to rotate collar 74 in the opposite counterclockwise or delatching direction. This has the effect of causing body 72 to shift upwardly under the influence of spring 106 and as permitted by the cam mechanism until the intermediate "stop" position is reached, whereupon the apparatus again reassumes the configuration depicted in FIG. 3. At this point, of course, the operating member 94 is withdrawn sufficiently to permit closing of valve assembly 32 under the influence of coil spring 42.

Normally, the user would simply turn operator 74 between the "off" and "on" positions as desired in order to selectively use the apparatus. However, when the cylinder 12 becomes depleted, it is necessary to remove actuator assembly 18 so as to permit cylinder changeovers (normally, such cylinders would each include a valve body 14 which is factory installed). When cylinder replacement becomes necessary, the user merely grasps operating collar 74 and rotates the same in the counterclockwise or detaching direction to the original "connect" position depicted in FIG. 2. It is then only necessary to lift the actuating assembly 18 from the head 24 of the valve body 14, such being readily accomplished inasmuch as the locking tabs are again in alignment with the orienting slots 52. Reconnection of the assembly 18 to a fresh cylinder 12 merely involves repeating the steps outlined above.

Figure 9:
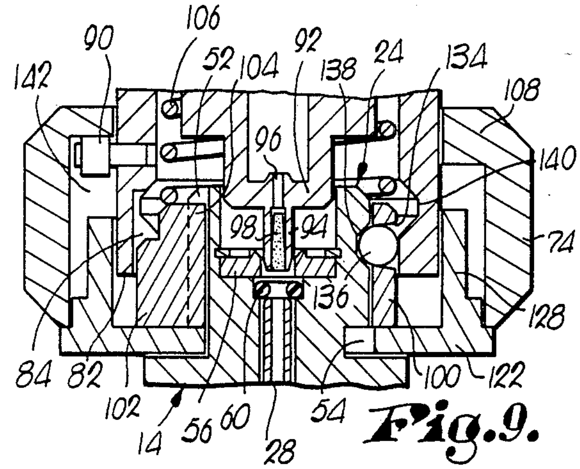
FIG. 9 is a fragmentary view in vertical section illustrating the operative components of the latching-actuator apparatus, and depicting a second embodiment thereof including a ball and detent locking mechanism.
Figure 8:
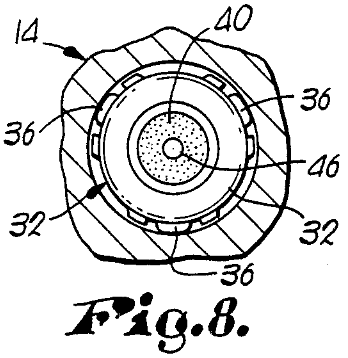
FIG. 8 is an enlarged sectional view illustrating the upper end of the poppet assembly forming a part of the valve body of the invention.

Attention is now directed to FIG. 9 which illustrates another embodiment of the invention making use of releasable connecting structure which is different from the latching device described, in order to initially connect and orient the assembly 18 onto valve body 14. Inasmuch as many of the components illustrated in FIG. 9 are identical with those described in connection with FIGS. 1-8, like numbers will be employed for like parts, and no further discussion of these components will be provided. In this embodiment, however, the sleeve 100 is provided with three ball-retaining apertures 134 therethrough which are equally circumferentially spaced from each other and equally spaced from the orienting ribs 104. A corresponding ball 136 is situated within each aperture 134, and the inboard diameter of each of the apertures 134 is smaller than the diameter of balls 136, so as to prevent the balls from completely passing through the apertures.

The outer periphery of head 24 is also provided with three equally circumferentially spaced detents 138 which are equally spaced from the orienting slots 52 and configured to receive the portion of a ball 136 projecting beyond sleeve 100. The skirt 82 is provided with a continuous groove 140 along the inner sidewall thereof which is likewise configured for receiving the balls 136. Finally, the upstanding inboard walls 128 forming a part of the shiftable collar 74 are modified slightly in this embodiment, to provide a relieved area 142 at the "connect" stop position 120. The latching-actuator apparatus is illustrated in the "connect" position in FIG. 9, where it will be seen that the skirt 82 of valve body 72 is shifted upwardly to its maximum extent where groove 140 is vertically spaced from the balls 136, which has the effect of camming these balls into the opposed detents 138. This provides a locking action separate and apart from the latching apparatus comprising the tabs 126 and locking slot 54. If it is desired to fully remove the assembly 18 from the valve body 14 in this embodiment, it is only necessary to grasp the flow control body 72 and depress the same downwardly against the bias of spring 106 until the groove 140 comes into alignment with the balls 136, such being permitted because of the relieved areas 142 in the cam grooves. The user then also grasps the rotatable collar 74 in order to maintain the depressed position of the flow control body 72 relative to the collar. The user then simply pulls upwardly in order to separate the assembly 18 from the valve body 14. During this action, the respective balls 136 are cammed out of their associated detents 138, and are partially received within the groove 140, thereby permitting complete separation of the assembly 14. Reconnection of the assembly 18 to the valve body 14 merely involves a reversal of the foregoing procedure. It will further be appreciated that the presence of the ball and detent locking mechanism of this embodiment in no way alters the on-off operation of the actuator assembly, and indeed comes into play only during an actual connection operation of the actuator assembly to a valve body.

It will thus be seen that the present invention provides a greatly improved latching-actuator apparatus which has a number of distinct advantages. Primary among these advantages are the fact that the user can quite readily accomplish the on-off operation and that, when the collar 74 is turned to the off position, the valve assembly 32 is automatically and fully closed independently of the force required to rotate the operating collar. This is to be contrasted with some prior valves which require considerable strength and application of torque to ensure that the valves are completely sealed. Moreover, the latching-actuator apparatus hereof permits a patient user to readily change cylinders and prevents inadvertent removal of the assembly 18 when gas is passing from the cylinder 12.

Finally, those skilled in the art will appreciate that the apparatus of the invention can readily be rendered gas-specific. That is to say, while a completely symmetrical locking tab and orienting slot arrangement can be used as described above, it would of course be possible to provide a different, non-symmetrical arrangement as well. Thus, a specific complemental arrangement of tabs and orienting slots can be provided for each particular type of gas commonly sold. As a consequence, a patient receiving oxygen for example could only attach a single model of actuating assembly 18 to an oxygen cylinder; if the patient inadvertently received a cylinder containing a gas other than oxygen having a differently slotted valve body head, then the oxygen actuating assembly could not be used inasmuch as the tabs thereof would not align with slots of the nonoxygen valve body.

We claim:

1. Latching and actuator apparatus for attachment to the outlet of a source pressurized fluid, said apparatus comprising:

a body including means for connection thereof to said outlet;

an assembly separate from said body, one of said body and assembly including an operating element shiftable in a first and a second direction;

latching structure having a portion movable with respect to said body for selectively latching said assembly to, and delatching said assembly from, said body;

selectively openable and closeable valve means; and means operably coupling said shiftable operating element to said movable portion, and to said vlave means, for latching said assembly to said body as said operating element is shifted in said first direction, and for opening of said valve means only upon further shifting of said element in said first direction subsequent to latching of said assembly to said body, and for closing said valve means upon shifting said element in said second direction and permitting delatching of said assembly from said body only upon further shifting of said element in said second direction and only after said valve means is closed, said apparatus including structure defining a fluid flow passageway from said outlet to a fluid discharge, for flow of fluid from said source through said passageway and out said discharge, when said assembly is latched to said body and said valve means is open, said valve means being operatively interposed in said passageway.

2. Apparatus as set forth in claim 1, said valve means being mounted in said body, and said assembly including said operating element.

3. Apparatus as set forth in claim 2, said valve means comprising a seat formed in said body, a sealing member, and means biasing said member into fluid flow-blocking contact with said seat.

4. Apparatus as set forth in claim 3, said means operably coupling said element to said valve means comprising actuator means at least partially carried by said assembly and operatively coupled to and shiftable in response to shifting of said element, said actuator means being oriented for engaging said sealing member and moving the same away from said seat, when said element is shifted to an on position for permitting flow of fluid from said source, through said passageway and valve means, and out said discharge.

5. Apparatus as set forth in claim 4, said actuator means comprising structure carried by said assembly defining a cam slot, and cam pin means slidably received in said slot, said slot and cam pin means being constructed and arranged for effecting reciprocation of a portion of said assembly relative to said shiftable element, there being a valve actuating member carried by said portion of said assembly.

6. Apparatus as set forth in claim 5, said cam slot being provided in said shiftable element, said pin means being affixed to said assembly portion and extending into said slot.

7. Apparatus as set forth in claim 5, said cam slot being provided with three spaced stop positions along the length thereof.

8. Apparatus as set forth in claim 1, said element being bidirectionally rotatable.

9. Apparatus as set forth in claim 1, said assembly including said operating element, said latching structure comprising slot means in said body, and complemental tab means forming a part of said assembly.

10. Apparatus as set forth in claim 9, said tab means being secured to and shiftable with said operating element.

11. Apparatus as set forth in claim 10, said slot means including a series of orienting slots equal in number to said tab means and located for initially receiving said tab means, when the assembly is initially oriented relative to the body for connection thereof, and a locking slot in communication with said orienting slots for receiving said tab means and permitting said shifting of said operating element in a latching direction for preventing inadvertent separation of said assembly from said body by virtue of interference between said tab means and the defining walls of said locking slot.

12. Apparatus as set forth in claim 11, including a projection carried by said assembly and located for being received in one of said orienting slots of said body, when said element is oriented in said initial connection position with one of said tab means in alignment with said projection, said projection being out of alignment with said one tab means when the element is shifted from said initial connection position.

13. Apparatus as set forth in claim 12, said connecting means comprising cooperative ball and detent means on said body and assembly.

14. Apparatus as set forth in claim 1, including releasable connecting means, different from said latching structure, for initially connecting and orienting said assembly on said body.

15. Apparatus as set forth in claim 1, including over-pressure vent means in operative communication with said passageway.

16. Latching and actuator apparatus for attachment to the outlet of a source of pressurized fluid, said apparatus comprising:

a body including means for connection thereof to said outlet, structure defining a first fluid flow passageway from said outlet to a terminus, and selectively openable and closable valve means supported by the body and operatively interposed in said first passageway for selectively permitting and precluding fluid flow therethrough, said valve means having means biasing the valve means to a closed, flow precluding position;

an assembly complemental with and separate from said body and including a bidirectionally rotatable operating element selectively rotatable in respective latching and delatching directions, and structure defining a second fluid flow passageway therethrough leading to a discharge;

latching structure for operably latching said assembly to said body to communicate said first and second passageways when said body and assembly are complementally oriented and said element is rotated in said latching direction, and for delatching said assembly from said body to permit separation thereof when said element is rotated in said delatching direction, said latching structure including a movable latching portion coupled with and movable in response to said rotation of said element for effecting operative engagement of the latching structure, said element being rotatable in said latching direction for a predetermined distance beyond the latching point where said latching structure is operatively engaged;

actuator means operably coupled between said element and said valve means for opening of the valve means, said actuator means including a shiftable member carried by said assembly and operably coupled with and movable in response to said rotation of said element, there being valve operator means engageable by said member when said element is rotated in said latching direction beyond said latching point for opening of said valve means, said biasing means being operable, upon rotation of said element in said delatching direction and consequent shifting of said member out of engagement with said valve operator means, for closing said valve means prior to said element reaching said latching point.

17. Apparatus as set forth in claim 16, said actuator means comprising structure defining a cam slot in said element, and a cam pin received in said slot and operatively connected to said member, said member being reciprocable generally along the axis of rotation of said element, when said element is bidirectionally rotated.

18. Apparatus as set forth in claim 16, said movable latching portion comprising tab means connected to said element, said latching structure also including slot means on said body for receiving said tab means.

19. A separate actuating assembly for a compressed fluid valve body having a selectively openable and closeable valve, said assembly comprising:

a component having a connection end and a discharge end, and a centrally disposed, elongated valve-actuating member adjacent the connection end thereof, said member having a valve-closing position and a valve-opening position;

an annular operating element positioned adjacent and receiving said connection end of said component and rotatable in opposite first and second directions, said connection end and element cooperatively presenting a central valve body-receiving opening, said member extending into said opening;

a plurality of latching tabs extending into said opening for receipt by said valve body;

means operably coupling said operating element to said tabs, and to said valve-actuating member, for:

(1) rotation of said tabs when said element is rotated in said first direction from a delatching to a latching position relative to said valve body, and shifting of said valve-actuating member from the valve-closing to the valve-opening position thereof only upon further shifting of said element in said first direction subsequent to said tabs reaching said latching position; and (2) shifting of said valve-actuating member from said valve-closing position to said valve-opening position thereof upon rotation of said operating element in said second direction, and for rotation of said tabs from the latching to the delatching position thereof only upon further shifting of said element in said second direction and only after said valve-actuating member has reached said valve-closing position.

20. The assembly of claim 19, said component being axially reciprocable with said member.

21. The assembly of claim 19, including at least one projection carried said component and extending into said opening, said projection being in alignment with one of said tabs when said element is in a selected position, said one tab moving out of alignment with said projection when said element is rotated from said selected position.

22. The assembly of claim 19, said member being tubular.

* * * * *